3,366,495
METHOD OF PRESERVING FRESH FROZEN PORK SAUSAGE
Donald L. Paul, Madison, Raymond H. Griesbach and John F. Jaeger, Monona Village, Wis., assignors to Oscar Mayer & Co., Inc., Chicago, Ill.
No Drawing. Filed Oct. 19, 1964, Ser. No. 404,950
10 Claims. (Cl. 99—194)

ABSTRACT OF THE DISCLOSURE

Shelf life of fresh sausage which is frozen promptly after preparation and held in the frozen condition is prolonged in respect to oxidative rancidity. At least 90% of the salt used in the latter has dispersed thereon a mixture of antioxidants comprising citric acid and at least one hindered phenol antioxidant of the group butylated hydroxyanisole, butylated hydroxytoluene and propyl gallate. The total antioxidant content of the sausage should preferably not exceed about 0.02% of the fat content.

---

The present invention relates to certain improvements in the preparation of pork sausage whereby substantial projection against rancidity is imparted to the pork sausage when held in the frozen condition.

Large volumes of pork sausage are consumed annually in this country. A large proportion thereof is commercially manufactured and then distributed and sold through retail outlets to consumers. In order to prolong the relatively short period of time in which the highly perishable fresh pork sausage may be stored before it is consumed, it is increasingly the practice to promptly freeze the product after it has been stuffed into casing and to hold it in the frozen condition until it is sold.

Pork sausage deteriorates relatively rapidly due to both bacteriological spoilage and oxidative rancidity. The freezing of fresh pork sausage and holding the same in the frozen condition successfully protects the product against bacteriological spoilage but not against oxidative rancidity. As a result, an objectionable level of oxidative rancidity develops within approximately three weeks' time due to the catalytic activity of the salt which is present. The salt acts to greatly accelerate the development of rancidity in frozen pork, especially when the pork is held in a frozen condition.

It has been known to incorporate antioxidants into unfrozen pork sausage to protect the same against rancidity. For example, Patent No. 2,933,399, dated Apr. 19, 1960, discloses the use of various fat-soluble and water-soluble antioxidants in various meat products including pork sausage. In Example 1 of this patent there is disclosed the procedure wherein small quantities of BHA (butylated hydroxyanisole) and DMP (2,6-dimethoxyphenol) were added to the seasoning which was incorporated in the sausage batter. The resulting product was stored at a temperature above freezing and in the range of 40–43° F. for up to fourteen days for purposes of testing the bacterial growth therein.

In accordance with the present invention it has been found that in order to be effective in protecting frozen pork sausage against rancidity, the antioxidants used must be dispersed on substantially all (e.g. on at least about 90%) of the salt that is used in producing the sausage batter. In fact if the antioxidants are not pre-dispersed on all of the salt alone prior to its use in the batter no appreciable amount of protection against rancidity will be obtained.

Accordingly, the object of the present invention, generally stated, is the provision of improvements in the production of frozen pork sausage whereby it is afforded substantial protection against rancidity when held in the frozen condition, such protection being provided by using as salt (NaCl) in the sausage batter that which has had predispersed thereon certain antioxidants which include citric acid and one or more other antioxidants of the hindered phenol type.

For a more complete understanding of the nature and scope of the invention reference may now be had to the following description thereof wherein for purposes of the present invention the antioxidants dispersed on the salts will include citric acid and in addition at least one socalled hindered phenol antioxidant such as butylated hydroxyanisole (BHA), butylated hydroxytoluene (BHT) or propyl gallate. When all three hindered phenol antioxidants are used together, approximately 2 parts by weight of each BHA and BHT are present for each part by weight of propyl gallate. Desirably a small amount of propylene glycol (i.e., a fraction of one percent by weight of the meat) is used to improve the distribution and dispersion onto the salt. The total amount of antioxidants that may be used will usually be dictated by governmental regulation. In general the total content should not exceed 0.02% of the fat content of the finished pork sausage product. Desirably, the combined weight of the salt and the antioxidants dispersed thereon equals about 2% by weight of the pork sausage batter.

The following salt formulations having the antioxidants dispersed thereon represent two preferred formulations:

*Formulation 1*

| | Percent by weight |
|---|---|
| Sodium chloride | 97.090 |
| Tricalcium phosphate | 2.010 |
| Butylated hydroxyanisole | 0.266 |
| Butylated hydroxytoluene | 0.268 |
| Citric acid | 0.268 |
| Propylene glycol | 0.100 |

*Formulation 2*

| | Percent by weight |
|---|---|
| Sodium chloride (fine flake) | 97.090 |
| Tricalcium phosphate | 2.010 |
| Butylated hydroxyanisole | 0.204 |
| Propyl gallate | 0.124 |
| Propylene glycol | 0.100 |
| Citric acid | 0.260 |
| Butylated hydroxytoluene | 0.204 |

In preparing Formulations Nos. 1 and 2 the propylene glycol may first be warmed to 125–135° F. and then the citric acid dissolved therein, after which the propyl gallate (Formulation No. 2) is added until dissolved. The BHA and BHT may be added to the mass for stirring so that a completely uniform mixture is obtained. This mixture may then be added with stirring to the sodium chloride and tricalcium phosphate with mixing continued until a completely uniform blend is obtained. It will be understood that a number of other mixing procedures and techniques may be used as desired.

In use, the salt having the antioxidant mixture dispersed thereon is added or included as part of the so-called spice mixture used in preparing the sausage batter. The following example will serve to illustrate one specific method in which the invention may be practiced.

EXAMPLE 1

Three hundred pounds of pork trimmings and nine pounds of ice and/or water are loaded into a chopper bowl. The spice, which will contain 29 oz. per 100 pounds of meat of either Formulation No. 1 or No. 2 above together with such other ingredients, as pepper, sage, and dextrose, is spread evenly on the meat as the bowl rotates. The chopping may continue for such time as is required to obtain a uniform mixture. For example, chop for a total of 18 revolutions as follows: 5 r.p.m. for one minute; 12 r.p.m. for one minute; and then unload completely in one revolution.

The chopped pork sausage is promptly stuffed at a maximum temperature of approximately 36° F. into casings and the casings are linked in known manner. The stuffed links are immediately frozen in a blast freezer or a chill tunnel to an internal temperature of 22–26° F. Thereupon the frozen product is packed in cartons and the cartons are transferred to a freezer at 0–5° F. tempertaures and frozen solid to a minimum temperature of 10° F. The product is retained in the hard frozen condition until such time as it is delivered to the retail store or other outlet.

When Formulation No. 1 comprising approximately equal parts of citric acid, butylated hydroxyanisole and butylated hydroxytoluene is used in preparing the sausage batter in accordance with Example 1 with 29 oz. of the antioxidant ingredients dispersed on salt being used for each 100 pounds of meat ingredients, it will be seen that the pork sausage product will have the following antioxidant content or composition:

| | Percent |
|---|---|
| BHA | 0.0049 |
| BHT | 0.0049 |
| Citric acid | 0.0050 |

It has been determined that when salt without any antioxidants dispersed thereon is used in producing fresh frozen pork sausage that oxidative rancidity develops in approximately three weeks' time due to the catalytic activity of the salt which is present. However, by incorporating salt which has the antioxidants pre-dispersed thereon as disclosed above, the product may be held in the frozen condition for at least approximately six weeks before objectional oxidative rancidity develops therein. Thus, by means of the present invention the shelf or storage of the frozen pork sausage is approximately doubled.

It has also been ascertained that if the antioxidants are not pre-dispersed on at least about 90% of the salt content, but merely incorporated as another ingredient of the spice mix, they will not afford the full protection against rancidity of the duration obtainable in acordance with this invention.

While in the foregoing description an illustrative example and formulations have been set forth, it will be understood that various modifications may be made without departing from the spirit and scope of the invention.

What is claimed as new is:

1. In the method of making fresh frozen pork sausage wherein chopped pork sausage batter containing salt is freshly prepared and promptly frozen, the improvement which comprises protecting the frozen pork sausage against oxidative rancidity by incorporating in the batter to the extent of at least about 90% of the salt content thereof, salt which has already had dispersed thereon an effective amount not exceeding a small fraction of one percent by weight of the meat of a mixture of antioxidants comprising citric acid and an antioxidant of the hindered phenol type.

2. In the method of making fresh frozen pork sausage wherein chopped pork sausage batter containing salt is freshly prepared and promptly frozen, the improvement which comprises protecting the frozen pork sausage against oxidative rancidity by incorporating in the batter to the extent of at least about 90% of the salt content thereof, salt which has already had dispersed thereon an effective amount not exceeding a small fraction of one percent by weight of the meat of a mixture of antioxidants comprising citric acid, butylated hydroxyanisole and butylated hydroxytoluene.

3. In the method of making fresh frozen pork sausage wherein chopped pork sausage batter containing salt is freshly prepared and promptly frozen, the improvement which comprises protecting the frozen pork sausage against oxidative rancidity by incorporating in the batter to the extent of at least about 90% of salt which has already had dispersed thereon an effective amount not exceeding a small fraction of one percent by weight of the meat of a mixture of antioxidants comprising citric acid, butylated hydroxyanisole, butylated hydroxytoluene and propyl gallate.

4. In the method of making fresh frozen pork sausage wherein chopped pork sausage batter containing salt is freshly prepared and promptly frozen, the improvement which comprises protecting the frozen pork sausage against oxidative rancidity by incorporating in the batter to the extent of at least about 90% of the salt content thereof salt which has already had dispersed thereon an effective amount not exceeding a small fraction of one percent by weight of the meat of a mixture of antioxidants comprising approximately equal parts of citric acid, butylated hydroxyanisole and butylated hydroxytoluene.

5. In the method of making fresh frozen pork sausage wherein chopped pork sausage batter containing salt is freshly prepared and promptly frozen, the improvement which comprises protecting the frozen pork sausage against oxidative rancidity by incorporating in the batter to the extent of at least about 90% of the salt content thereof salt which has already had dispersed thereon an effective amount not exceeding a small fraction of one percent by weight of the meat of a mixture of antioxidants comprising approximately 2.6 parts of citric acid, approximately 2 parts of butylated hydroxyanisole, approximately 2 parts of butylated hydroxytoluene and 1 part of propyl gallate.

6. The improvement called for in claim 1 wherein a fraction of one percent of propylene glycol is incorporated along with the antioxidants.

7. The improvement called for in claim 1 wherein the amount of salt with said antioxidants dispersed thereon equals approximtaely 2% by weight of the batter.

8. The improvement called for in claim 1 wherein the salt with said antioxidants dispersed thereon has substantially the following composition:

| | Percent |
|---|---|
| Sodium chloride | 97.090 |
| Tricalcium phosphate | 2.010 |
| Butylated hydroxyanisole | 0.266 |
| Butylated hydroxytoluene | 0.268 |
| Citric acid | 0.268 |
| Propylene glycol | 0.100 |

9. The improvement called for in claim 1 wherein the salt with said antioxidants dispersed thereon has substantially the following composition:

| | Percent |
|---|---|
| Sodium chloride (fine flake) | 97.090 |
| Tricalcium phosphate | 2.010 |
| Butylated hydroxyanisole | 0.204 |
| Propyl gallate | 0.124 |
| Propylene glycol | 0.100 |
| Citric acid | 0.260 |
| Butylated hydroxytoluene | 0.204 |

10. The method of treating fresh pork sausage batter to protect it against rancidity when frozen promptly after preparation which comprises using in the sausage batter to the extent of at least about 90% of the salt content of the batter, salt which has dispersed thereon an effective amount not exceeding approximately 0.02% of the fat content of a mixture of antioxidants comprising citric acid, and at least one hindered phenol antioxidant selected from the group consisting of butylated hydroxyanisole, butylated hydroxytoluene and propyl gallate.

References Cited

UNITED STATES PATENTS

| | | |
|---|---|---|
| 2,511,804 | 6/1950 | Hall et al. 99—143 X |
| 2,645,581 | 7/1953 | Robison 99 |
| 2,845,358 | 7/1958 | Hall et al. 99—194 |
| 2,901,354 | 8/1959 | Douglass et al. 99—109 |
| 2,933,399 | 4/1960 | Nickerson et al. 99—109 X |
| 3,118,771 | 1/1964 | Albrecht 99—143 X |

HYMAN LORD, *Primary Examiner.*

UNITED STATES PATENT OFFICE
CERTIFICATE OF CORRECTION

Patent No. 3,366,495                                      January 30, 1968

Donald L. Paul et al.

It is certified that error appears in the above identified patent and that said Letters Patent are hereby corrected as shown below:

Column 3, line 27, "minimum" should read -- maximum --.

Signed and sealed this 13th day of January 1970.

(SEAL)
Attest:

Edward M. Fletcher, Jr.                              WILLIAM E. SCHUYLER, JR.
Attesting Officer                                               Commissioner of Patents